United States Patent
Baker et al.

(10) Patent No.: US 8,737,093 B1
(45) Date of Patent: May 27, 2014

(54) POWER CONVERTER WITH QUASI-RESONANT VOLTAGE MULTIPLIER HAVING SHARED SWITCHING NODE

(75) Inventors: Gary B. Baker, Sherwood, OR (US); Ravindranath Naiknaware, Portland, OR (US); Triet Tu Le, Portland, OR (US)

(73) Assignee: SolarBridge Technologies, Inc., Austin, TX (US)

( * ) Notice: Subject to any disclaimer, the term of this patent is extended or adjusted under 35 U.S.C. 154(b) by 207 days.

(21) Appl. No.: 13/196,843

(22) Filed: Aug. 2, 2011

Related U.S. Application Data

(60) Provisional application No. 61/370,085, filed on Aug. 2, 2010.

(51) Int. Cl.
*H02M 3/335* (2006.01)
(52) U.S. Cl.
USPC .......................... 363/21.03; 323/225; 307/82
(58) Field of Classification Search
USPC .............. 323/222–224; 363/59, 60, 123, 124; 327/536–540
See application file for complete search history.

(56) References Cited

U.S. PATENT DOCUMENTS 7,161,331 B2 * 1/2007 Wai et al. ...................... 323/222

OTHER PUBLICATIONS

Z. Zhang, O. C. Thomsen, M. A. E. Andersen, "Two-stage DC-DC Converter for the Fuel Cell Super-capacitor Hybrid System," IEEE Energy Conversion Congress and Exposition, 2009, pp. 1425-1431.*

"Voltage Multiplier Cells Applied to Non-isolated DC-DC Converters," M. Prudent, L. Pfitscher, G. Emmendoerfer, E. Romaneli, and R. Gules, IEEE Transactions on Power Electronics, vol. 23, No. 2, Mar. 2008.*
"A Review of Non-Isolated High Step-Up DC/DC Converters in Renewable Energy Applications," W. Li, X. Lu, Y. Deng, and X. He, in Proc. 24th Annu. IEEE Applied Power Electronics Conf. Exposition, Washington DC, Feb. 15-19, 2009, pp. 364-369.*
Prudente, M. et al., "A Boost Converter with Voltage Multiplier Cells," IEEE, 2005, pp. 2716-2721.
Barbi, I. et al., "Isolated DC-DC Converters with High-Output Voltage for TWTA Telecommunication Satellite Applications," IEEE, 2001, 10 pages.
Seong, H et al., "Zero-Voltage Switching Flyback-Boost Converter with Voltage-Doubler Rectifier for High Step-Up Applications," Energy Conversion Congress and Exposition IEEE, Aug. 1, 2010, pp. 823-829.
Rosas-Caro, J.C. et al., "A Family of DC-DC Multiplier Converters," IANEG Engineering Letters, vol. 19, Issue 1, Jan. 19, 2010, 11 pages.
Erickson, R. W., "Chapter 20—Quasi-Resonant Converters", slideshow, Fundamentals of Power Electronics, 1997-2004, 46 pages.

* cited by examiner

*Primary Examiner* — Adolf Berhane
*Assistant Examiner* — Jye-June Lee
(74) *Attorney, Agent, or Firm* — Boisbrun Hofman, PLLC

(57) ABSTRACT

A power converter is disclosed including a switching converter having a switching node, a first quasi-resonant multiplier stage having a resonant input coupled to the switching node, and a second quasi-resonant multiplier stage having a resonant input coupled to the switching node. In another embodiment, a power converter includes a switching converter having a switching node, a first quasi-resonant multiplier stage having a boost input coupled to the switching node, and a first clamp coupled to the first multiplier stage.

21 Claims, 8 Drawing Sheets

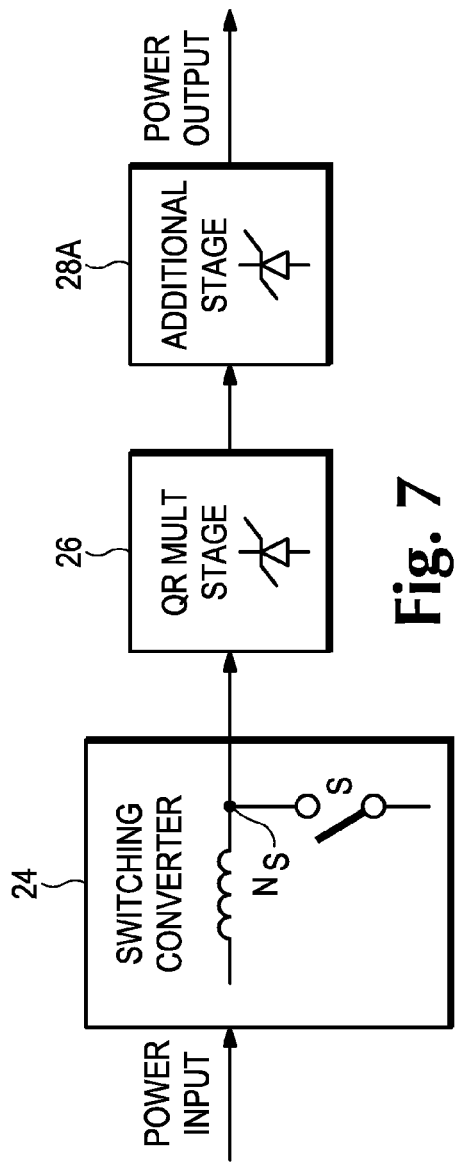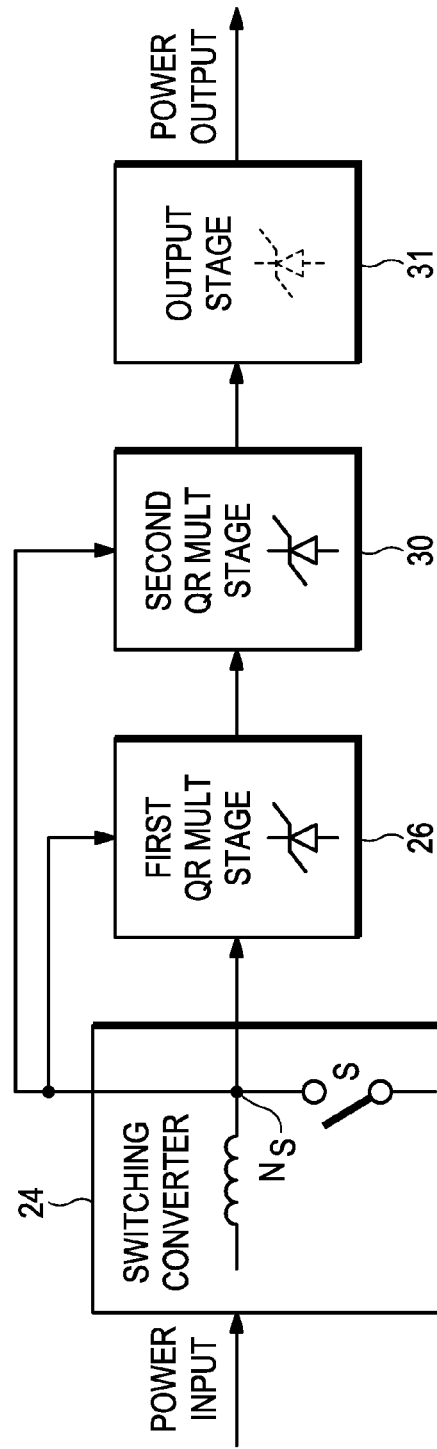

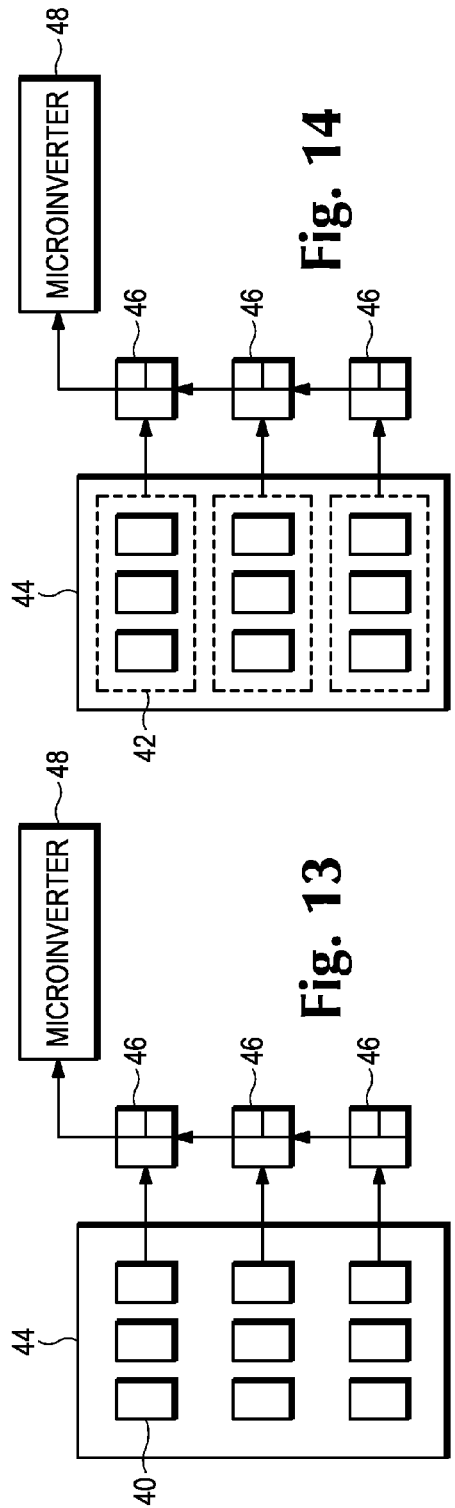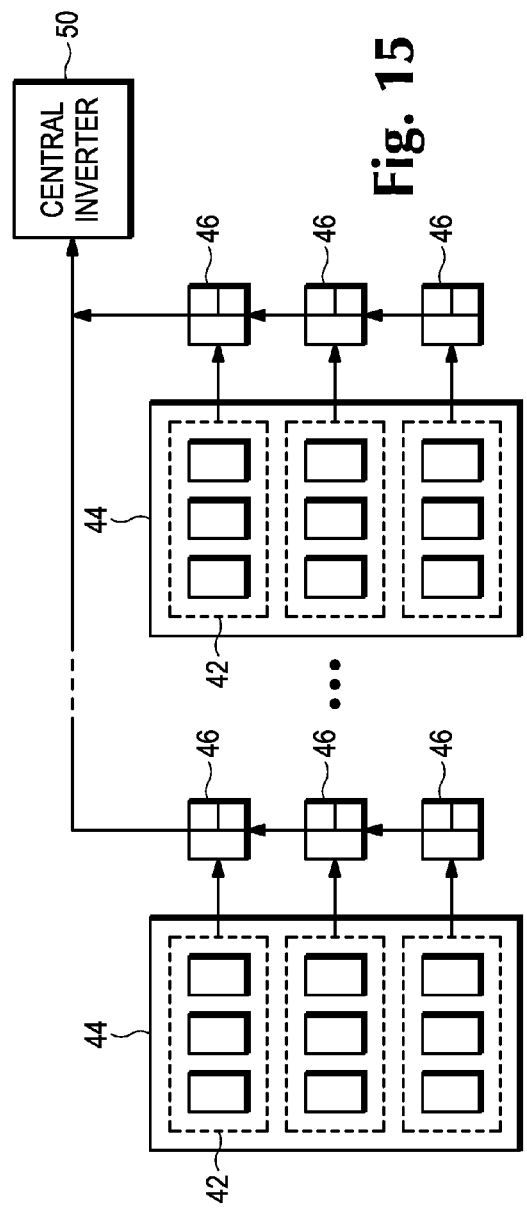

POWER CONVERTER WITH QUASI-RESONANT VOLTAGE MULTIPLIER HAVING SHARED SWITCHING NODE

CROSS-REFERENCE TO RELATED APPLICATIONS

This application claims priority from U.S. Provisional Patent Application Ser. No. 61/370,085 titled Converter With Quasi-Resonant Voltage Multiplier filed Aug. 2, 2010.

BACKGROUND

FIG. 1 illustrates a prior art DC-DC converter that utilizes a boost converter followed by a voltage multiplier stage to step up the voltage available from a power source. The boost converter 10 includes an input inductor $L_{IN}$ that receives power from an input voltage source $V_{IN}$, and a transistor switch S coupled to the inductor $L_{IN}$ at a switching node $N_S$. The voltage multiplier stage 12 includes two diodes $D_{M1}$ and $D_{M2}$ connected in series between the switching node $N_S$ and a boost node $N_B$. A multiplier stage capacitor $C_{M1}$ is coupled to an intermediate node $N_I$ between the diodes $D_{M1}$ and $D_{M2}$. A resonant inductor $L_R$ and capacitor $C_{M2}$ are connected in series between the switching node $N_S$ and the boost node $N_B$ and impart a quasi-resonant characteristic to the multiplier stage. The converter of FIG. 1 also includes an output or filter stage 14 having another diode $D_O$, as well as an output capacitor $C_O$. The output load is shown as a load resistor $R_O$.

With proper tuning, the quasi-resonant characteristics of the multiplier stage reduce the maximum voltage across the transistor switch S, as well as enable it to operate with zero current switching (ZCS). Both of these characteristics reduce stress on the switch, thereby improving reliability and reducing its cost. These characteristics also enable the use of lower voltage switching devices which reduces the on-state resistance of the devices, thereby reducing switching losses and enabling the converter to operate at higher frequencies.

A single multiplier stage, however, may not provide adequate voltage gain for many applications. Therefore, additional voltage multiplier stages may be added as shown in FIG. 2, which illustrates a generalized converter having a boost stage 10 followed by a total of M multiplier stages 12-1, 12-2, ... 12-M. Each multiplier stage includes two diodes and two capacitors. Only the first stage is shown with a resonant inductor $L_R$, but additional inductors could be connected in series with capacitors $C_{22}$ ... $C_{M2}$ in the successive stages as well. The additional multiplier stages increase the voltage gain of the converter by a factor of M+1, which theoretically increases the output voltage by factor of (M+1) times the maximum switch voltage.

BRIEF DESCRIPTION OF THE DRAWINGS

FIG. 7 illustrates another embodiment of a power converter having voltage clamping according to some inventive principles of this patent disclosure.

FIG. 8 illustrates yet another embodiment of a power converter having voltage clamping according to some inventive principles of this patent disclosure.

FIGS. 13-17 illustrate some additional embodiments of power conversion systems according to some inventive principles of this patent disclosure.

DETAILED DESCRIPTION

As mentioned above, the use of a total of M series-connected voltage multiplier stages after a boost converter theoretically increases the output voltage by factor of (M+1) times the maximum switch voltage. In an actual circuit implementation, however, some practical considerations may reduce the efficiency, dynamic performance and/or reliability of the converter and prevent it from realizing the theoretical output. Furthermore, such implementations can lead to much reduced converter efficiency.

Figure 2:
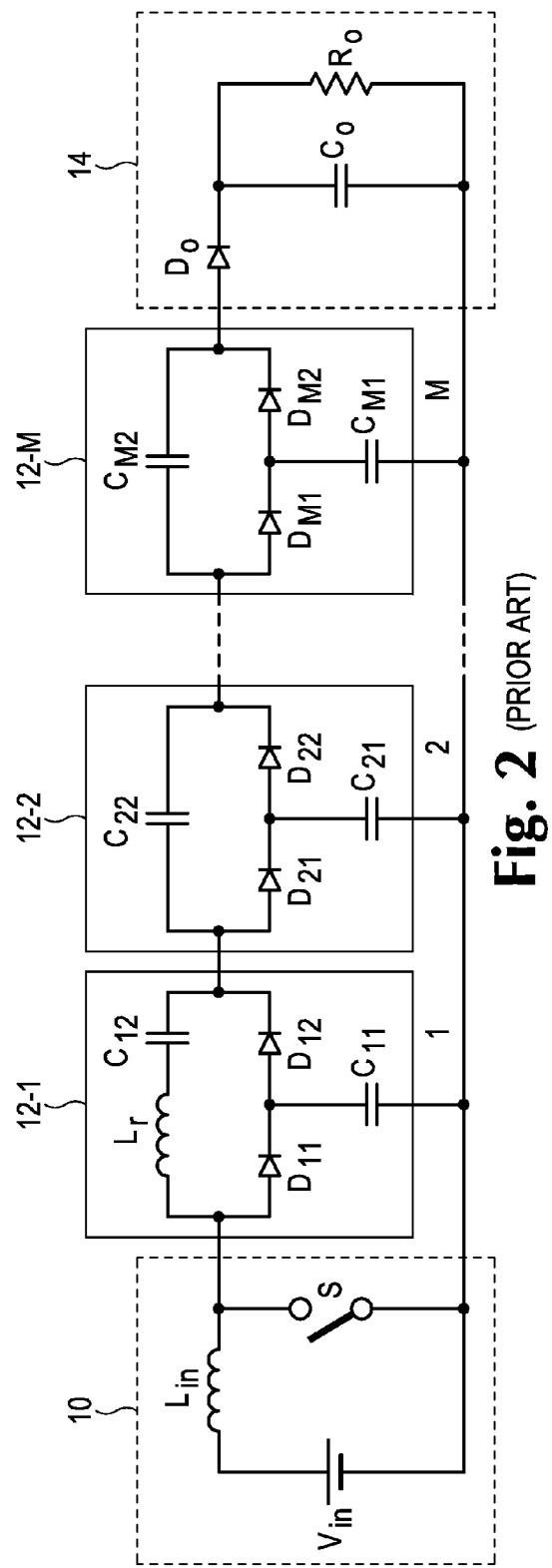
FIG. 2 illustrates a prior art DC-DC converter that utilizes a boost converter followed by multiple voltage multiplier stages.

First, the resonant inductor $L_R$ shown in FIG. 2 creates different resonant characteristics with the resonant capacitors $C_{12}$, $C_{22}$, ... $C_{2M}$ in the different multiplier stages, thereby causing inconsistent behavior between the various stages. This problem cannot be resolved by including an additional inductor in series with each of the resonant capacitors $C_{12}$, $C_{22}$, ... $C_{2M}$ because each of the various multiplier stages are separated from the switching node $N_s$ by a different number of resonant impedances. These different resonant characteristics may increase the switching transients and associated stress on the transistor switch S, thereby leading to failure of the switch.

Second, achieving the maximum theoretical output voltage assumes an even distribution of stepped-up voltages across each of the stages. An arbitrary distribution of voltages, however, may appear across the different stages, especially at start up and during switching transients.

Quasi-Resonant Multiplier Stages with Parallel Inputs

Figure 3:
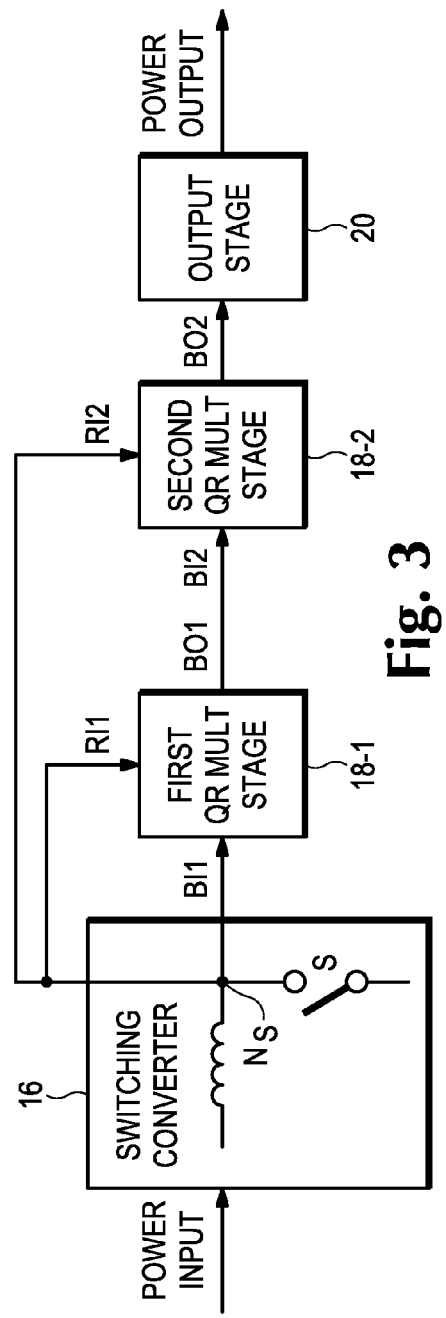
FIG. 3 illustrates an embodiment of a power converter having quasi-resonant multiplier stage with parallel inputs according to some inventive principles of this patent disclosure.

FIG. 3 illustrates an embodiment of a power converter having quasi-resonant multiplier stages with parallel inputs according to some inventive principles of this patent disclosure. The embodiment of FIG. 3 includes a switching converter 16 that receives input power from a power source and generates a switching power signal at a switching node $N_S$.

The switching converter 16 may be implemented with a boost converter, a buck-boost converter, or any other suitable switching topology that provides a switching power signal at a switching node $N_S$.

A first quasi-resonant multiplier stage 18-1 has a boost input BI1 connected to the switching node $N_S$, a resonant input RI1 coupled to the switching node $N_S$, and a boost output BO1. A second quasi-resonant multiplier stage 18-2 has a boost input BI2 connected to the boost output BO1 of the first multiplier stage 18-1, a resonant input RI2 connected to the switching node $N_S$, and a boost output BO2 connected to an output stage 20. The quasi-resonant multiplier stages may be implemented with switched capacitor circuits or any other suitable topology in which components are arranged to provide resonant characteristics that reduce switching stresses on the switching converter 16.

Because the resonant inputs of the two multiplier stages are both coupled to the same switching node $N_S$, they may be configured to have the same or similar resonant behavior as explained in more detail below.

Figure 4:
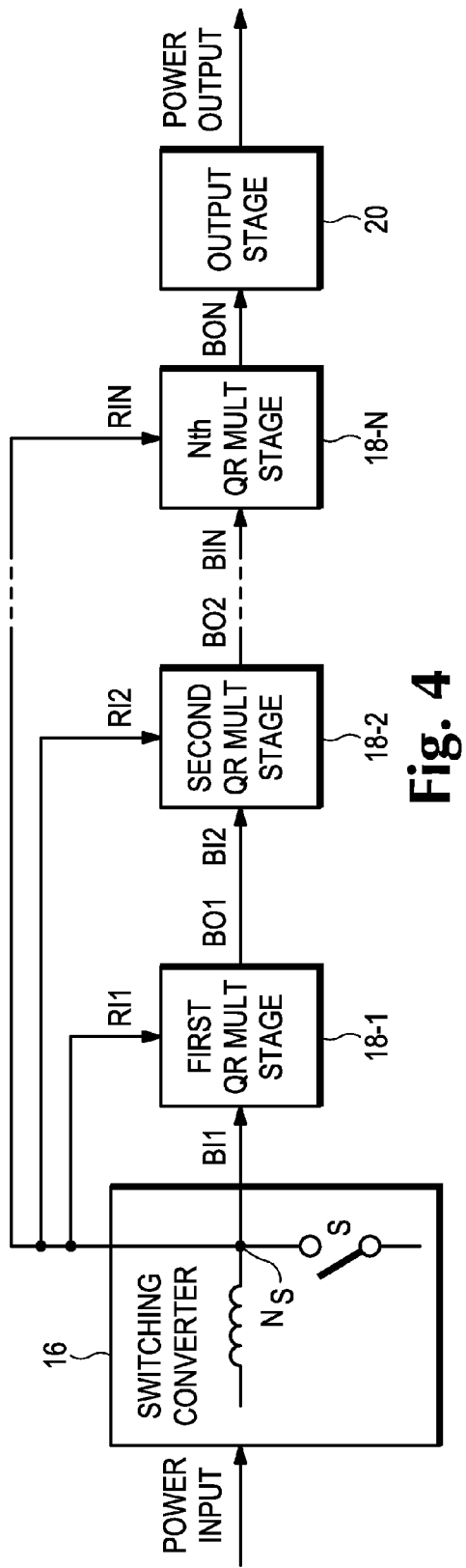
FIG. 4 illustrates another embodiment of a power converter having quasi-resonant multiplier stage with parallel inputs according to some inventive principles of this patent disclosure.

The inventive principles illustrated with respect to the embodiment of FIG. 3 may be extended to any number N of quasi-resonant multiplier stages having resonant inputs connected in parallel as shown in FIG. 4.

Figure 5:
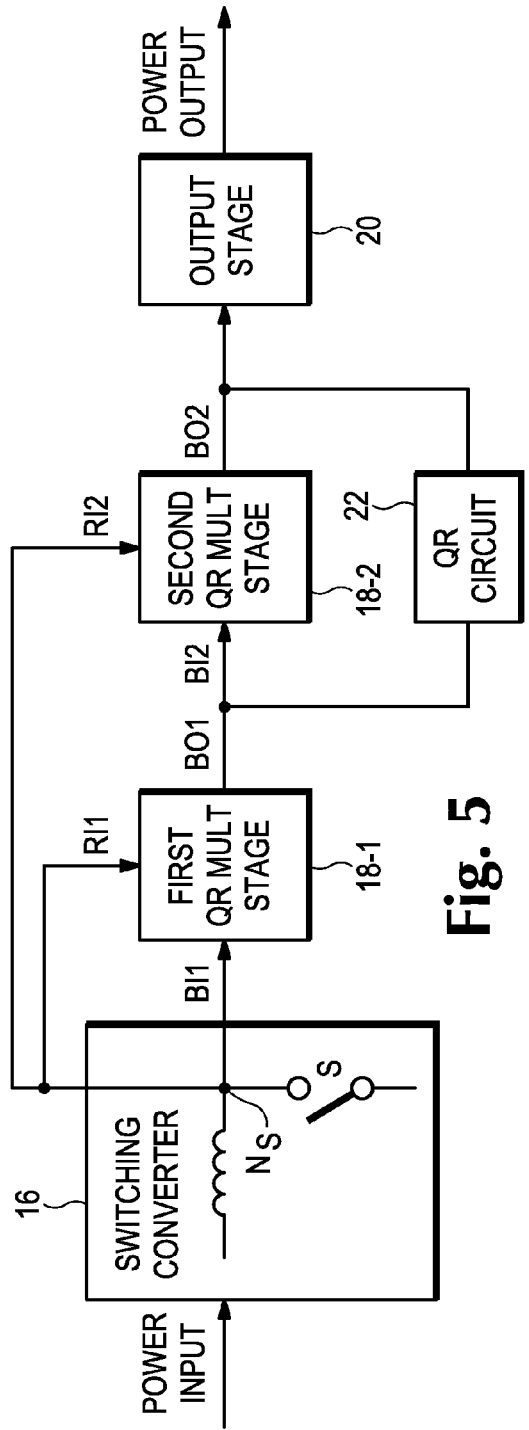
FIG. 5 illustrates an embodiment of a hybrid power converter system according to some inventive principles of this patent disclosure.

FIG. 5 illustrates an embodiment of a hybrid power converter according to some inventive principles of this patent disclosure. The embodiment of FIG. 5 includes first and second quasi-resonant multiplier stages 18-1 and 18-2 having resonant inputs connected in parallel to the same switching node $N_S$ in a manner similar to the embodiment of FIG. 3. The embodiment of FIG. 5, however, includes a quasi-resonant circuit 22 connected across the second multiplier stage 18-2.

In some embodiments, the quasi-resonant circuit 22 may simply include a capacitor that forms a resonance with an inductor in the first multiplier stage 18-1. In other embodiments, the quasi-resonant circuit 22 may include an inductor and a capacitor to provide its own complete resonant characteristic, or some combination of resonances with other components.

The inclusion of an additional quasi-resonant circuit may provide improved performance and relax the demands placed on the switching converter as explained in more detail below.

Additional hybrid embodiments according to the inventive principles may include additional quasi-resonant circuits connected in series with other quasi-resonant multiplier stages such as those shown in FIGS. 3 and 4, as well as other series-parallel combinations of quasi-resonant circuits and quasi-resonant multiplier stages.

Voltage Clamping

Figure 6:
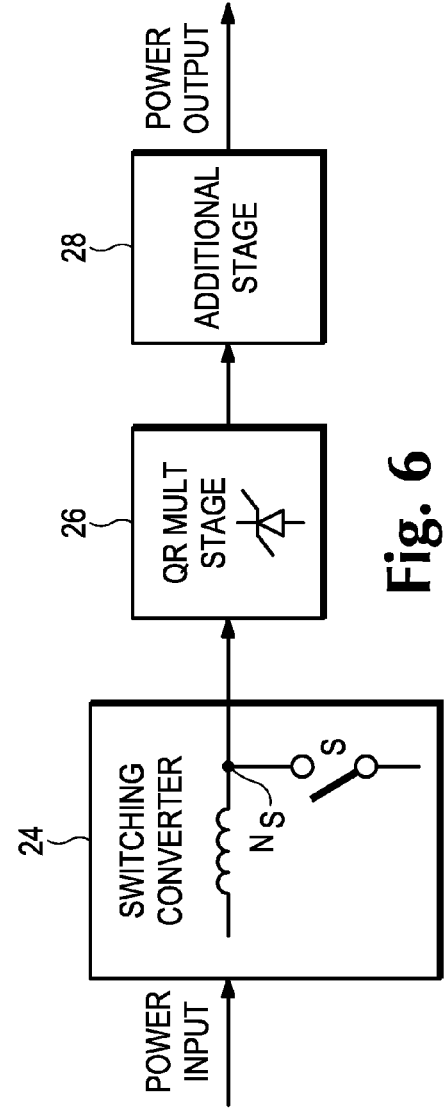
FIG. 6 illustrates an embodiment of a power converter having voltage clamping according to some inventive principles of this patent disclosure.

FIG. 6 illustrates an embodiment of a power converter having voltage clamping according to some inventive principles of this patent disclosure. The embodiment of FIG. 6 includes a switching converter 24, a quasi-resonant stage 26 having a voltage clamping feature, and an additional stage 28. The quasi-resonant stage 26, and additional stage 28 are arranged to provide voltage gain relative to the input power received at the switching converter 24, and include a nominal voltage distribution between the two stages 26 and 28.

The switching converter 24 may be implemented with a boost converter, a buck-boost converter, or any other suitable switching topology that provides a switching power signal at a switching node $N_S$. The quasi-resonant stage 26 may be implemented with a diode-capacitor voltage multiplier or charge pump or any other suitable multiplier topology, while the additional stage 28 may be implemented as an output filter, another multiplier stage, etc.

Figure 1:
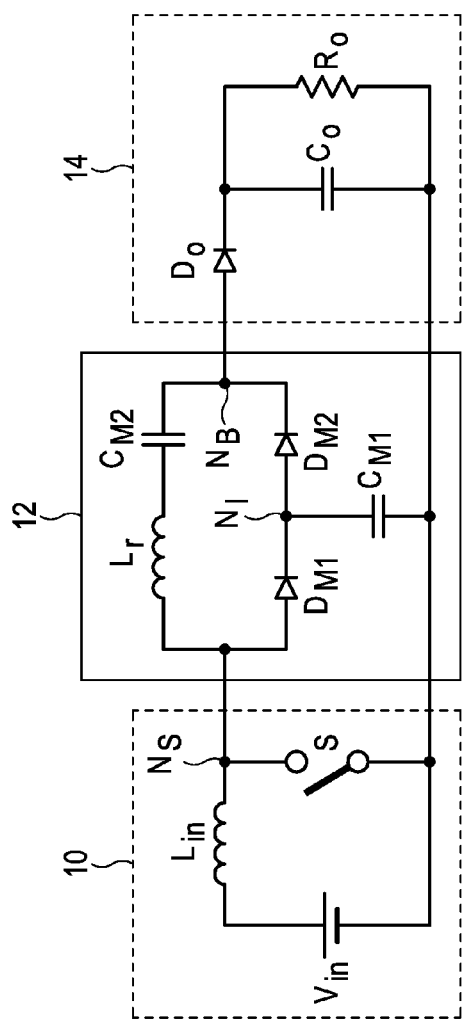
FIG. 1 illustrates a prior art DC-DC converter that utilizes a boost converter followed by a single voltage multiplier.

In one example embodiment, the converter of FIG. 6 may be implemented in a manner similar to the prior art circuit of FIG. 1 with the switching converter 24 realized as a boost converter 10, the quasi-resonant stage 26 realized as a quasi-resonant voltage multiplier stage 12, and the additional stage 28 realized as an output filter 14 as shown in FIG. 1. In such an embodiment, a nominal voltage distribution occurs between capacitors $C_{M1}$ and $C_O$ such that the voltage across capacitor $C_O$ is twice the voltage across capacitor $C_{M1}$. However, according to the inventive principles, the quasi-resonant voltage multiplier stage also includes a voltage clamp across the capacitor $C_{M1}$ to prevent undefined or unbalanced voltages from appearing across capacitors $C_{M1}$ and $C_O$, especially at start-up or during load transients. Moreover, the clamps may reduce voltage and/or current spikes during normal switching transients, thereby reducing stress on the switching transistor.

FIG. 7 illustrates another embodiment of a power converter having voltage clamping according to some inventive principles of this patent disclosure. The embodiment of FIG. 7 includes a switching converter 24, a quasi-resonant stage 26 having a voltage clamping feature, and an additional stage 28 as in the embodiment of FIG. 6. However, in the embodiment of FIG. 7, the additional stage 28 also includes a voltage clamping feature to more accurately distribute the total voltage between stages 26 and 28. Thus, if the embodiment of FIG. 7 is implemented with a topology similar to that of FIG. 1, voltage clamps may be included across capacitor $C_O$ as well as capacitor $C_{M1}$. Alternatively, if the embodiment of FIG. 7 is implemented with a topology similar to that of FIG. 2, voltage clamps may be included across capacitors $C_{11}$, $C_{21}$, etc.

FIG. 8 illustrates yet another embodiment of a power converter having voltage clamping according to some inventive principles of this patent disclosure. The embodiment of FIG. 8 combines the inventive principles related to voltage clamping with the inventive principles related to quasi-resonant multiplier stages with parallel inputs in a synergistic manner. The embodiment of FIG. 8 includes a switching converter 24, and two quasi-resonant stages 26 and 30 arranged with their resonant inputs connected in parallel. Both quasi-resonant stages 26 and 30 have voltage clamping features, and an output stage 31 may also include a voltage clamping feature.

The switching converter 24 may be implemented with a boost converter, a buck-boost converter, or any other suitable switching topology that provides a switching power signal at a switching node $N_S$. The quasi-resonant multiplier stages 26 and 30 may be implemented with diode-capacitor voltage multipliers or charge pumps or any other suitable multiplier topology.

DETAILED EXAMPLES

Figure 9:
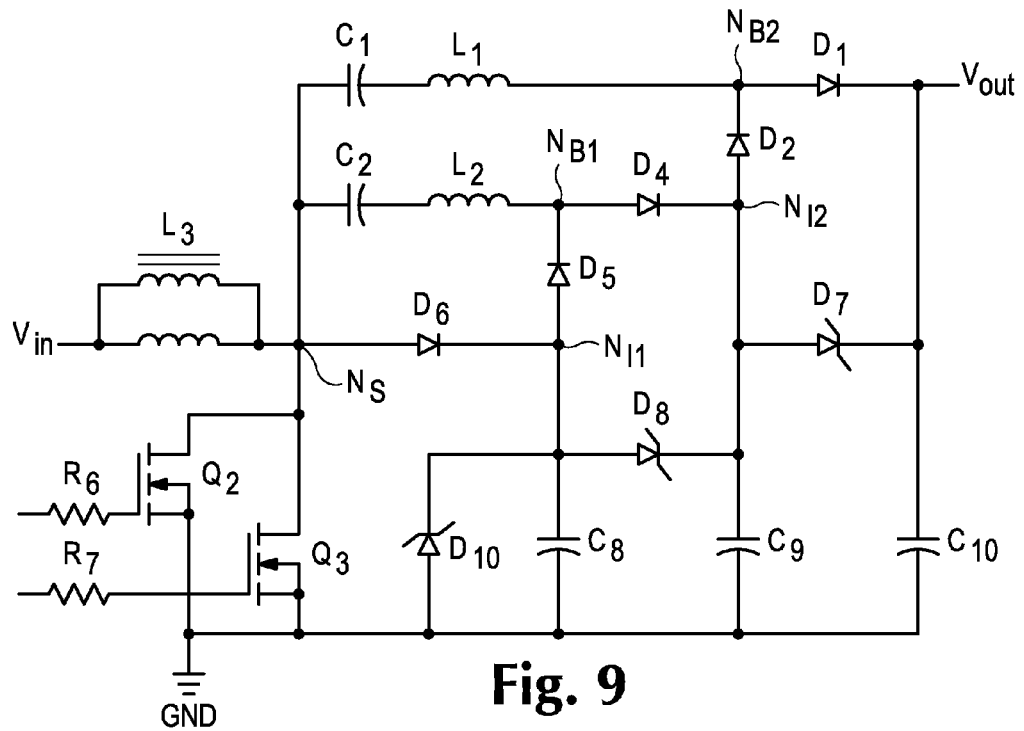
FIG. 9 illustrates a detailed example embodiment of a power converter that combines several inventive principles of this patent disclosure.

FIG. 9 illustrates a detailed example embodiment of a power converter that combines several inventive principles of this patent disclosure to provide robust, reliable, efficient and stable performance. The embodiment of FIG. 9 includes a boost converter having an input inductor L3 arranged to receive an input voltage $V_{IN}$, and a switching transistor $Q_2$ coupled between the input inductor L3 at a switching node $N_S$ and a ground reference node GND. (In the embodiment of FIG. 9, the input inductor L3 is illustrated as a parallel combination of inductors and the switching transistor $Q_2$ is illustrated as a parallel combination of Q2 and Q3 to provide added current carrying capacity, but these components may also be implemented as single instances.)

A first multiplier stage includes a first rectifier $D_6$ coupled between the switching node $N_S$ and a first intermediate node $N_{I1}$, a first stage capacitor $C_8$ coupled between the first intermediate node $N_{I1}$ and GND, a second rectifier $D_5$ coupled between the first intermediate node $N_{I1}$ and a first boost node $N_{B1}$, and a first resonant capacitor $C_2$ and a first resonant inductor $L_2$ coupled in series between the switching node $N_S$ and the first boost node $N_{B1}$.

A second multiplier stage includes a third rectifier $D_4$ coupled between the first boost node $N_{B1}$ and a second intermediate node $N_{I2}$, a second stage capacitor $C_9$ coupled between the second intermediate node $N_{I2}$ and GND, a fourth rectifier $D_2$ coupled between the second intermediate node $N_{I2}$ and a second boost node $N_{B2}$, and a second resonant capacitor $C_1$ and a second resonant inductor $L_1$ coupled in series between the switch node $N_S$ and the second boost node $N_{B2}$.

An output stage includes a fifth rectifier $D_1$ coupled between the second boost node $N_{B2}$ and an output node $V_{OUT}$, and an output capacitor $C_{10}$ coupled to the output node $V_{OUT}$.

A first voltage clamp in the form of a Zener diode $D_{10}$ is connected across the capacitor $C_8$. A second Zener diode $D_8$ is connected between the high sides of the capacitors $C_8$ and $C_9$, while a third Zener diode $D_7$ is connected between the high sides of the capacitors $C_9$ and $C_{10}$. In this configuration, the three Zener diodes $D_7$, $D_8$ and $D_{10}$ have the same voltage rating because they are stacked in series to provide equally distributed voltages at nodes $N_{I1}$, $N_{I2}$ and $V_{OUT}$. In other embodiments, the Zener diodes $D_7$, $D_8$ and $D_{10}$ may be connected directly across capacitors $C_8$, $C_9$ and $C_{10}$ and have progressively greater voltage ratings.

In operation, transistor $Q_2$ is switched with a duty cycle D at a suitable switching frequency, for example, 100 KHz. The duty cycle D is varied to control the average input current in inductor $L_3$. When the transistor $Q_2$ is on, the current in inductor $L_3$ charges to some peak value determined by the inductance value of the inductor $L_3$, the input voltage $V_{IN}$, and the transistor $Q_2$ on time. When transistor $Q_2$ is off, the inductor $L_3$ discharges into capacitor $C_8$ at a higher voltage than the input voltage $V_{IN}$.

When the transistor $Q_2$ is on, the capacitor $C_2$ is charged to a value equal to the voltage of the capacitor $C_8$ by a resonant current formed by the circuit including the inductor $L_2$ and the capacitor $C_2$ which has a magnitude that is driven by any difference between the charge states of the capacitors $C_8$ and $C_2$. When the transistor $Q_2$ is off, the inductor current drives one side of the capacitor $C_2$ (connected to the drain of the transistor $Q_2$) to the voltage of the capacitor $C_8$. Charge from the capacitor $C_2$ is then dumped into the capacitor $C_9$ to provide a voltage doubling function in a quasi-resonant manner. Another level of charge pump is provided by the combination of the inductor $L_1$ and the capacitor $C_1$ to get a final voltage out that is triple the voltage on the capacitor $C_8$.

Because the capacitor/inductor $C_2/L_2$ combination and the capacitor/inductor $C_1/L_1$ combination are both connected to the same switching node $N_S$, they may provide the same resonant behavior, thereby improving the performance of the converter. These improvements may include better tunability, improved stability, and resilience to parametric, thermal and aging effects.

The presence of the Zener diode voltage clamps $D_7$, $D_8$ and $D_{10}$ may prevent undefined or unbalanced voltages from appearing across capacitors $C_8$, $C_9$ and $C_{10}$, especially at start-up or during load transients. Moreover, the clamps may reduce voltage and/or current spikes during normal switching transients, thereby reducing stress on the switching transistor $Q_2$.

Figure 10:
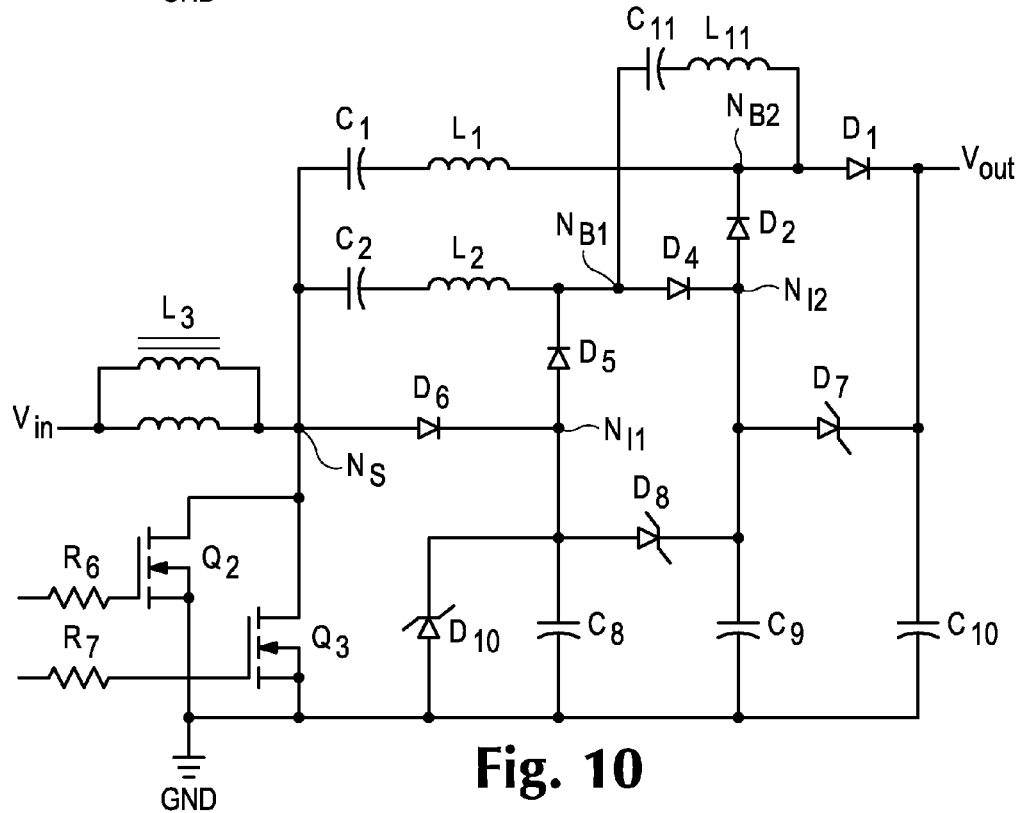
FIG. 10 illustrates another detailed example embodiment of a power converter having hybrid characteristics according to some inventive principles of this patent disclosure.

FIG. 10 illustrates another detailed example embodiment of a power converter having hybrid characteristics according to some inventive principles of this patent disclosure. The embodiment of FIG. 10 includes the same components as the embodiment of FIG. 9, but with the addition of a quasi-resonant circuit including capacitor $C_{11}$ and inductor $L_{11}$ connected in series between the first and second boost nodes $N_{B1}$ and $N_{B2}$.

The additional quasi-resonant circuit including capacitor $C_{11}$ and inductor $L_{11}$ shown in FIG. 10 may further enhance the benefits of the embodiment of FIG. 9 including better tunability, improved stability, and resilience to parametric, thermal and aging effects. Moreover, the capacitor $C_{11}$ and the inductor $L_{11}$ may further reduce crossover or transitional switching losses in the transistor $Q_2$, i.e., power losses that result from switching during periods of non-zero transistor voltage or current.

Referring again to FIG. 9, additional quasi-resonant voltage multiplier stages may be added. For example, a third multiplier stage may be added having a sixth rectifier coupled between the second boost node and a third intermediate node, a third stage capacitor coupled between the third intermediate node and GND, a seventh rectifier coupled between the third intermediate node and a third boost node, and a third resonant capacitor and a third resonant inductor coupled in series between the switch node and the third boost node. The output stage would then include the fifth rectifier $D_1$ coupled between the third boost node and the output node $V_{OUT}$, and the output capacitor $C_{10}$ would still be coupled to the output node $V_{OUT}$.

In any of the embodiments described above, any or all of the inductive components may be magnetically coupled. For example, in the embodiment of FIG. 9, any or both of inductors $L_1$ and $L_2$ may be magnetically coupled to each other and/or the input inductor $L_3$, e.g., by winding on a common magnetic core.

Some additional inventive principles relate to the use of multiple parallel instantiations of power converter. For example, the embodiment of FIG. 10 may be modified to include two identical instantiations of these circuits in which each circuit includes only one transistor and one inductor at the input instead of two each as shown. Then the output nodes $V_{OUT}$ can be combined for parallel operation. As a further refinement, the nodes NI1 and NI2 can be optionally connected together to from the two instantiations. As yet another refinement, during operation, the phases could be different on the transistors in each instantiation. In general, multiple instantiations could be operated in parallel with phase offsets on the switching signals of the gates of the transistors.

In general, the compensation network then can become more complex, where the L/C elements used for quasi-resonant circuits can cross-over to the other instantiations which are in parallel.

Applications

Although the inventive principles are not limited to any specific applications, they are especially suited to use with many renewable energy technologies such as photovoltaic (PV) solar systems, fuel cells, etc.

Figure 11:
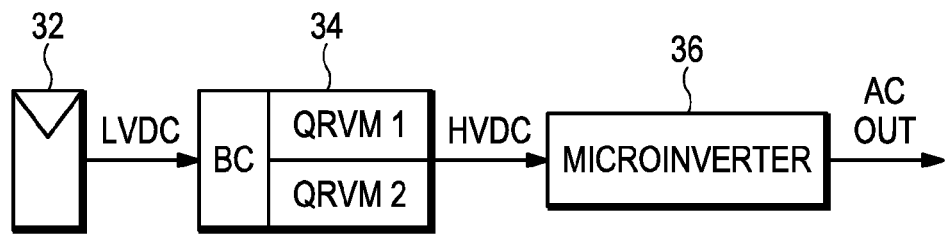
FIG. 11 illustrates an embodiment of a power conversion system according to some inventive principles of this patent disclosure.

FIG. 11 illustrates an embodiment of a power conversion system according to some inventive principles of this patent disclosure. The system of FIG. 11 includes a PV panel 32 that provides relatively low voltage DC power LVDC to a power converter 34. The power converter 34 includes a boost converter BC and two quasi-resonant multiplier stages QRVM having their resonant inputs connected in parallel to a switching node of the boost converter BC. The outputs of the multiplier stages QRVM are combined to provide relatively high voltage DC output power HVDC having voltage gain relative to the low voltage DC power. A microinverter 36 converts the high voltage DC output power to AC power suitable for feeding to a utility grid or local AC load. The power converter 34 may be realized using any of the techniques discussed above with respect to FIGS. 3-10.

Figure 12:
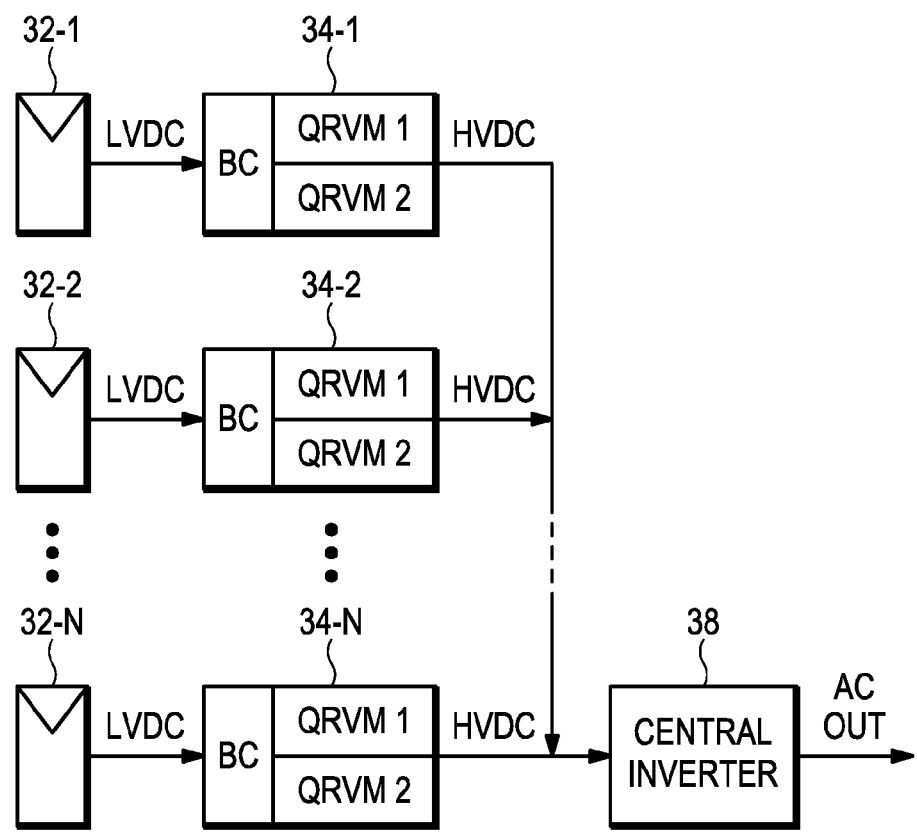
FIG. 12 illustrates another embodiment of a power conversion system according to some inventive principles of this patent disclosure.

FIG. 12 illustrates another embodiment of a power conversion system according to some inventive principles of this patent disclosure. The system of FIG. 12 includes multiple PV panels 32-1, 32-2, . . . 32-N, and multiple power converters 34-1, 34-2, . . . 34-N connected to receive the relatively low voltage DC power LVDC from the PV panels. Each of the power converters includes a boost converter BC and two quasi-resonant multiplier stages QRVM having their resonant inputs connected in parallel to a switching node of the boost converter BC. The outputs of the multiplier stages QRVM are combined to provide relatively high voltage DC output power HVDC having voltage gain relative to the low voltage DC power LVDC.

Rather than feeding a microinverter, however, the outputs from the multiple power converters 34-1, 34-2, . . . 34-N are combined in parallel and fed to a central inverter 38 that converts the combined high voltage DC output power to AC power suitable for feeding to a utility grid or local AC load.

FIGS. 13-17 illustrate some additional embodiments of power conversion systems in which individual cells 40 or sub-sets of series connected cells 42 in a PV panel or module 44 are used as the input to power converters according to some inventive principles of this patent disclosure.

In each of the embodiments of FIGS. 13-17, power converters 46 each include a boost converter and two quasi-resonant multiplier stages having their resonant inputs connected in parallel to a switching node of the boost converter similar to power converter 34 shown in FIG. 11.

FIG. 13 illustrates an embodiment in which the outputs from individual cells are 40 are applied to power converters 46 which are then connected in series to generate HVDC suitable for use by a microinverter 48.

FIG. 14 illustrates an embodiment in which the outputs from sub-sets of series connected cells 42 are applied to power converters 46 which are then connected in series to generate HVDC suitable for use by a microinverter 48.

FIG. 15 illustrates an embodiment in which the outputs from sub-sets of series connected cells 42 are applied to power converters 46 which are then connected in parallel to feed a central inverter 50.

Figure 16:
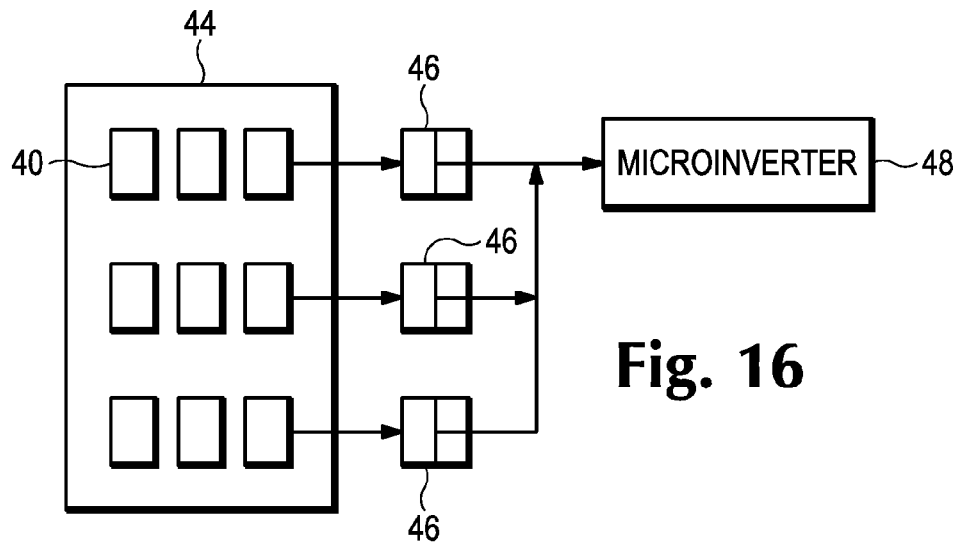

FIG. 16 illustrates an embodiment in which the outputs from individual cells 40 are applied to power converters 46 which are then connected in parallel to feed a microinverter 48.

Figure 17:
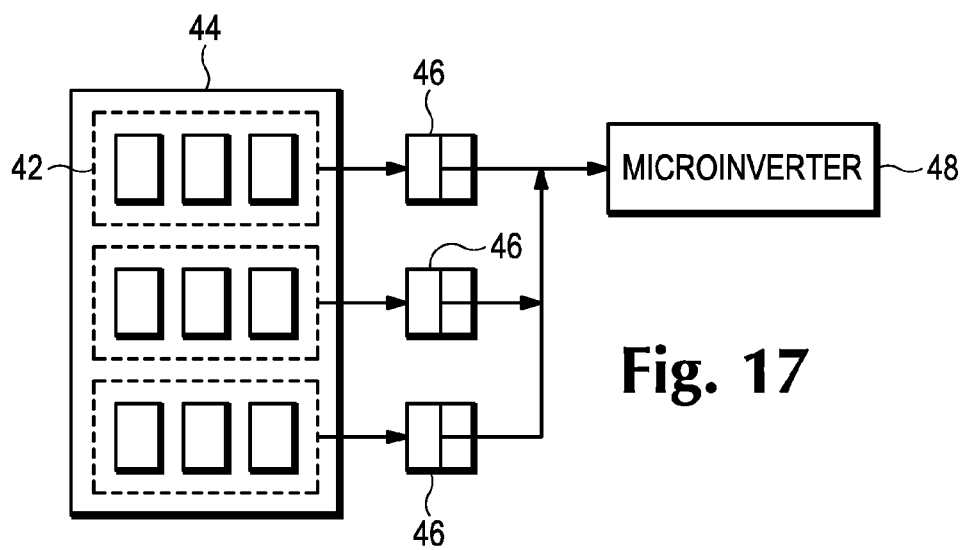

FIG. 17 illustrates an embodiment in which the outputs from sub-sets of series connected cells 42 are applied to power converters 46 which are then connected in parallel to feed a microinverter 48.

The inventive principles of this patent disclosure have been described above with reference to some specific example embodiments, but these embodiments can be modified in arrangement and detail without departing from the inventive concepts. For example, rectifiers have been illustrated as diodes, but as used herein, a rectifier may refer to a self-commutating device such as a diode, a synchronous rectifier such as a transistor switch, or any other suitable rectifier. Such changes and modifications are considered to fall within the scope of the following claims.

The invention claimed is:

1. A power converter comprising:
    a boost converter having an input inductor and a switching transistor coupled to the input inductor at a switching node;
    a first multiplier stage having a first rectifier coupled between the switching node and a first intermediate node, a first stage capacitor coupled to the first intermediate node, a second rectifier coupled between the first intermediate node and a first boost node, and a first resonant capacitor and a first resonant inductor coupled in series between the switching node and the first boost node;
    a second multiplier stage having a third rectifier coupled between the first boost node and a second intermediate node, a second stage capacitor coupled to the second intermediate node, a fourth rectifier coupled between the second intermediate node and a second boost node, and a second resonant capacitor and a second resonant inductor coupled in series between the switching node and the second boost node; and
    a quasi-resonant circuit including a third resonant capacitor and a third resonant inductor coupled in series between the first boost node and the second boost node.

2. The power converter of claim 1 further comprising an output stage having a fifth rectifier coupled between the second boost node and an output node, and an output capacitor coupled to the output node.

3. The power converter of claim 1 further comprising:
    a first clamp coupled to the first stage capacitor; and
    a second clamp coupled to the second stage capacitor.

4. The power converter of claim 1 further comprising a third multiplier stage having a fifth rectifier coupled between the second boost node and a third intermediate node, a third stage capacitor coupled to the third intermediate node, a sixth rectifier coupled between the third intermediate node and a third boost node, and a fourth resonant capacitor and a fourth resonant inductor coupled in series between the switching node and the third boost node.

5. The power converter of claim 1 wherein the input inductor is formed from a parallel combination of inductors.

6. The power converter of claim 1 wherein ones of the input inductor, the first resonant inductor, the second resonant inductor and the third resonant inductor are magnetically coupled.

7. The power converter of claim 1 wherein the switching transistor is formed from a parallel combination of transistors.

8. The power converter of claim 1 further comprising an output stage coupled between the second boost node and an output node, an output capacitor coupled to the output node, and a clamp coupled to the output capacitor.

9. The power converter of claim 1 wherein the input inductor is configured to receive an input voltage of the power converter.

10. The power converter of claim 1 further comprising a clamp coupled between the first stage capacitor and the second stage capacitor.

11. The power converter of claim 1 wherein a duty cycle of the switching transistor is configured to be varied to control an average input current in the input inductor.

12. A system comprising:
    a photovoltaic panel configured to provide a low voltage direct current power;

a power converter configured to receive the low voltage direct current power and provide a higher voltage direct current power, the power converter comprising:
- a boost converter having an input inductor and a switching transistor coupled to the input inductor at a switching node;
- a first multiplier stage having a first rectifier coupled between the switching node and a first intermediate node, a first stage capacitor coupled to the first intermediate node, a second rectifier coupled between the first intermediate node and a first boost node, and a first resonant capacitor and a first resonant inductor coupled in series between the switching node and the first boost node;
- a second multiplier stage having a third rectifier coupled between the first boost node and a second intermediate node, a second stage capacitor coupled to the second intermediate node, a fourth rectifier coupled between the second intermediate node and a second boost node, and a second resonant capacitor and a second resonant inductor coupled in series between the switching node and the second boost node; and
- a quasi-resonant circuit including a third resonant capacitor and a third resonant inductor coupled in series between the first boost node and the second boost node; and an inverter configured to convert the higher voltage direct current power to an alternating current power.

13. The system of claim 12 further comprising:
another photovoltaic panel configured to provide another low voltage direct current power;
another power converter, coupled in parallel to the power converter, configured to receive the another low voltage direct current power and provide another higher voltage direct current power, the inverter being configured to convert a combined higher voltage direct current power including the higher voltage direct current power and the another higher voltage direct current power to the alternating current power.

14. The system of claim 12 wherein the photovoltaic panel comprises individual cells or subsets of series connected cells to provide the low voltage direct current power.

15. The system of claim 12 wherein the power converter further comprises an output stage having a fifth rectifier coupled between the second boost node and an output node, and an output capacitor coupled to the output node.

16. The system of claim 12 wherein the power converter further comprises an output stage coupled between the second boost node and an output node, an output capacitor coupled to the output node, and a clamp coupled to the output capacitor.

17. The system of claim 12 wherein the power converter further comprises:
a first clamp coupled to the first stage capacitor; and
a second clamp coupled to the second stage capacitor.

18. The system of claim 12 wherein the power converter further comprises a clamp coupled between the first stage capacitor and the second stage capacitor.

19. The system of claim 12 wherein the power converter further comprises a third multiplier stage having a fifth rectifier coupled between the second boost node and a third intermediate node, a third stage capacitor coupled to the third intermediate node, a sixth rectifier coupled between the third intermediate node and a third boost node, and a fourth resonant capacitor and a fourth resonant inductor coupled in series between the switching node and the third boost node.

20. The system of claim 12 wherein the input inductor is formed from a parallel combination of inductors.

21. The system of claim 12 wherein the switching transistor is formed from a parallel combination of transistors.

* * * * *